United States Patent Office 2,808,442
Patented Oct. 1, 1957

2,808,442
PRODUCTION OF HYDROXY ETHERS

Curtis W. Smith and Douglas G. Norton, Berkeley, and George B. Payne, Albany, Calif., assignors to Shell Development Company, Emeryville, Calif., a corporation of Delaware No Drawing. Application June 16, 1953,
Serial No. 362,162

18 Claims. (Cl. 260—611)

This invention relates to the reaction of ethylenic compounds with peroxide hydroxylating agents under controlled conditions at which hydroxy ethers are obtained as a product.

As is well known, organic compounds which contain at least one ethylenic double bond, i. e. a double bond between two carbon atoms of aliphatic character, react with peroxide hydroxylating agents such as hydrogen peroxide to form polyhydroxy compounds by addition of two hydroxyl groups at the ethylenic double bond. A variety of different types of catalysts have been used in promoting such hydroxylations, as pointed out by Mugdan and Young in the Journal of the Chemical Society (1949), pages 2988–3000. Bergsteinsson patent—U. S. 2,373,942 discloses and claims the use of tungstic acid catalysts which are especially advantageous hydroxylation promoters. Such hydroxylations have been carried out in aqueous media or in different types of non-reactive organic solvents. In all cases the products, as far as we have been able to determine, have been the expected polyhydroxy compounds or partial esters thereof when the hydroxylation has been conducted in the presence of a carboxylic acid. No production of hydroxy ethers from the reaction of ethylenic compounds with peroxide hydroxylating agents has apparently been reported hitherto.

An important object of the present invention is to provide a method of converting ethylenic compounds to hydroxy ethers by reaction with peroxide hydroxylating agents. A particular object is the catalytic reaction of an ethylenic compound with hydrogen peroxide in the presence of a primary or secondary alcohol under conditions regulated to promote attachment of a hydroxyl group and an ether radical on adjacent carbon atoms of the starting ethylenic compound. Still other objects and advantages of the process of the invention will be apparent from the following description.

The present invention is based upon the discovery that, by the proper combination of catalyst and proportions of reactants, hydroxy ethers can be obtained as products in the reaction of ethylenic compounds with peroxides provided there is present sufficient of a primary or secondary alcohol, which, if it is an ethylenic alcohol, can be the ethylenic reactant. Primary and secondary alcohols are well known to be readily oxidized, particularly at the carbinol group, by peroxides, especially hydrogen peroxide. It is on this account that the more difficulty oxidizable tertiary alcohols have been generally used when carrying out reactions with such peroxide in solution in an alcohol. It was surprising to find, therefore, that ethylenic compounds can be successfully reacted with peroxide in the presence of primary and secondary alcohols without undesirable oxidation of such alcohols. Apparently, in the presence of an ethylenic compound preferential reaction of the peroxide at the ethylenic linkage or linkages takes place and primary or secondary alcohols are not attacked as they are in the absence of ethylenic compounds. Even more unexpected was the discovery that the primary and secondary alcohols, unlike tertiary alcohols, can take part in the reaction with the ethylenic compound and form hydroxy ethers.

As catalyst for the new reaction, one must use an acid capable of reacting with the peroxide employed in the reaction to form a peracid under the reaction conditions. It is also necessary that the acid be a strong one, i. e. have an ionization constant for the first hydrogen greater than $1.86 \times 10^{-5}$ at 25° C., since otherwise hydroxy esters are formed instead of the desired hydroxy ethers. Typical examples of inorganic acids which fulfill these requirements and are effective catalysts for the new reaction are tungstic acid, the polytungstic acids, heteropolytungstic acids such as phosphotungstic acid, selenotungstic acid, tungstomolybdic acid, bisomotungstic acid, and the like, molybdic acid, vanadic acid, chromic acid, sulfuric acid, etc. Organic strong acids such as trifluoroacetic, trichloromethanephosphonic acid, trichloroacetic, p-toluene sulfonic acid and alkane sulfonic acid are also effective catalysts. Other types of hydroxylation catalysts are not suitable. Thus, osmium tetroxide, although often incorrectly referred to as forming osmic and perosmic acids, is not effective in the new process because it apparently operates by a different mechanism involving addition of the osmium tetroxide to the ethylenic bond or bonds which precludes the formation of hydroxy ethers. Tungstic acid catalysts, which expression is intended to include the heteropolytungstic acids, are preferred in carrying out the reaction because they have less tendency than other peracid-forming catalysts to promote undesirable oxidation or decomposition of peroxides to oxygen.

Another essential requirement for good conversions to hydroxy ethers in accordance with the invention is that at least 10 moles, and more preferably about 12 to 35 moles, of primary or secondary alcohols or mixtures thereof be used per mole of peroxide employed. As previously indicated, the primary or secondary alcohol used can be an ethylenic alcohol, in which case no other ethylenic compound need be present. Where a saturated primary or secondary alcohol is used, an ethylenic compound must be present. Preferably, about 10 to about 70 moles of such saturated alcohol are used per mole of ethylenic compound. About 0.5 to about 5, preferably about 1 to about 2, moles of non-alcoholic ethylenic compound are used per mole of peroxide employed. The overall reaction may be represented by the following equation in which hydrogen peroxide is used as illustrative of the peroxide which may be employed:

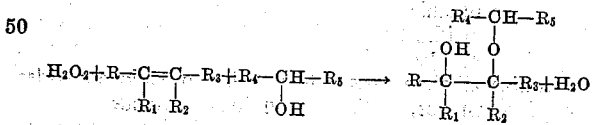

where R, $R_1$, $R_2$, $R_3$, $R_4$ and $R_5$ represent hydrogen atoms or organic radicals.

It is desirable to maintain in the reaction mixture a high concentration of primary and/or secondary alcohol, the hydroxy ether of which it is desired to produce. Preferably, a concentration of such alcohol of at least 60 percent by weight of the total reaction mixture, and more preferably from about 70 to about 99 percent, is used. It is especially desirable that the water content of the mixture be kept as low as possible; preferably less than 3.67 moles of water, exclusive of that formed in the reaction, are present per mole of peroxide employed for the reaction. Diluents which are inert under the reaction conditions or which undergo reactions which do not interfere with the formation of the desired hydroxy ether or ethers, for instance, organic solvents for the reactants and product such as saturated tertiary alcohol, ethers, esters, ketones, etc., can be present but generally are of no advantage.

The reaction is preferably carried out with the reactants in the liquid phase at temperatures of the order of about 0° C. to about 150° C. The higher the temperature, the shorter the time required for completion of the reaction, but temperatures in the range of about 30° C. to about 75° C. are generally preferred. About 2 to 6 hours is usually sufficient under most conditions. Ordinary pressures are generally satisfactory for the reaction, but higher or lower pressures can also be used whether liquid or vapor phase reaction conditions are employed. Relatively small amounts of the strong acid catalysts are effective in the reaction. Amounts in the range of about 0.005 to 0.075 mole of acid per mole of the peroxide employed have been generally used, although somewhat larger amounts are usually not detrimental. Preferred proportions are 0.01 to 0.04 mole of strong acid catalyst per mole of peroxide.

The process can be carried out batchwise, continuously or intermittently. One suitable method of batch reaction is to mix the reactants and catalyst in the proper ratios and heat the mixture for the required time, after which the mixture can be worked up, for example, by distillation, to recover the hydroxy ether produced from the unreacted starting materials and by-products (which usually include some hydroxylation products of the starting ethylenic compound) also formed in the reaction. While it is usually preferred to mix all the reactants at once, there is sometimes an advantage in first mixing the primary or secondary alcohol reactant and the ethylenic compound in those cases where the alcohol and ethylenic compound are different compounds, i. e. where ethylenic alcohols are not being used as combined alcohol and ethylenic compound, and then adding the peroxide portionwise to the mixture over a sufficient period of time so that there is no undue rise in temperature from the exothermic reaction, since if all the peroxide is added at the beginning there may be a tendency in some cases for the reaction to get out of hand. Where an ethylenic alcohol is to serve as both ethylenic reactant and primary or secondary alcohol, one can likewise mix the peroxide therewith either all at once or portionwise. For continuous operation, a plurality of reactors in series through which the reaction mixture is passed can be used, or the reaction mixture can be continuously pumped through a tubular or other suitable form of reactor in which the proper flow rate and temperature is maintained so as to keep the reaction within the previously indicated ranges of conditions.

Any suitable peroxide hydroxylating agent can be used successfully in the new reaction. Most preferably, hydrogen peroxide is employed, but other inorganic peroxides or organic peroxides are effective. Sodium and barium peroxides and the like are examples of other inorganic peroxides which can be used when acidified to neutralize alkaline salts, while typical organic peroxides are, for instance, tertiary butyl hydroperoxide and the like. Mixed peroxides such as are obtained by partial oxidation of hydrocarbons, for example, as described in U. S. Patent 2,376,257, are another example of the peroxides which can be used in producing hydroxy ethers according to the invention. When using aqueous peroxides, we prefer to employ solutions of 80% or higher peroxide content, most preferably hydrogen peroxide of 90% to 100% concentration, although more dilute solutions, for example 30% hydrogen peroxide, can be used.

The reaction can be carried out with any type of ethylenic compound which can be aliphatic, alicyclic or heterocyclic ethylenic compounds which can contain aromatic rings in the molecule. The ethylenic alcohols, which can be primary, secondary or tertiary alcohols, are especially advantageous starting materials. Examples of suitable alcohols are allyl alcohol, methyl vinyl carbinol, methallyl alcohol, crotyl alcohol, allyl carbinol, ethyl vinyl carbinol, dimethyl vinyl carbinol, methyl isopropenyl carbinol, methallyl carbinol, the cyclopentenols and cyclohexenols, styryl carbinol, oleyl alcohol, and the like. When the ethylenic alcohol used is tertiary, it is necessary to have a primary or secondary alcohol present since it has been found that steric hindrance or other factors make tertiary alcohols ineffective etherification agents in the present reaction. Ethylenic ethers, acids, esters, ketones, aldehydes and organic halides are other types of suitable starting ethylenic compounds. Examples of suitable ethylenic carboxylic acids are, for instance, acrylic acid, methacrylic acid, crotonic acid, tiglic acid, oleic acid, maleic acid, etc., and esters thereof with any of the foregoing or other ethylenic alcohols or with saturated alcohols. When ethylenic aldehydes are used as starting materials, oxidation to acids may accompany the reaction so hydroxy ether acids may be produced. Examples of aldehydes which can thus be used are acrolein, methacrolein, crotonaldehyde, tiglic aldehyde, beta-methylcrotonaldehyde, and the like. Suitable ethylenic ketones which can be converted to hydroxy and ether-substituted ketones are methyl vinyl ketone, methyl allyl ketone, ethylidene acetone, methyl isopropenyl ketone, mesityl oxide, etc. Olefins such as ethylene, propylene, the butylenes, the amylenes and higher homologues thereof, cyclopentene, cyclohexene, methyl cyclohexene; diolefins such as butadiene, isoprene or other pentadienes, cyclopentadiene, methyl cyclopentadiene, cyclohexadiene, dicyclopentadiene, etc.; olefinic halides such as allyl chloride, allyl bromide, allyl fluoride, methallyl chloride, crotyl bromide, crotyl iodide, and the like; ethers, as methyl allyl ether, ethyl allyl ether, methyl methallyl ether, diallyl ether, dimethallyl ether, allyl crotyl ether, etc., and especially the water-soluble ethers such as glycol monoallyl ether, glycerol monoallyl ether, and the like, are other suitable ethylenic starting materials for use in the reaction. Substitution products of the foregoing ethylenic compounds, for instance, halo-substitution products of the ethylenic alcohols, ethers, aldehydes and ketones having the halogen atom or atoms linked to non-ethylenic carbon atoms, can likewise be successfully converted to hydroxy ethers by the process of the invention.

Drying oils, semi-drying oils and other ethylenic triglycerides, for example, linseed oil, tung oil, corn oil, soya bean oil, sesame oil, fish oils, etc. and the mono- and di-ethylenic fatty acids obtainable therefrom, are especially useful starting materials which can be reacted according to the process of the invention to introduce hydroxy and ether groups at adjacent carbon atoms linked by ethylenic bonds in the starting compound. High molecular weight polyethylenic compounds such as polymers of butadiene, isoprene and the like, including natural and synthetic rubbers, etc., are another useful type of starting material for the reaction.

The primary or secondary alcohol which serves as the etherifying agent in the new reaction can likewise vary widely in character. Aliphatic saturated monohydric alcohols such as methanol, ethanol, normal or isopropanol, isobutanol, secondary butanol, decanol, lauryl and stearyl alcohols, etc. are suitable. Cyclic alcohols, including cyclopentanol, cyclohexanol, benzyl alcohol, the phenols, etc., are also effective. Polyhydroxy alcohols such as ethylene glycol, diethylene glycol, pentaerythritol, sorbitol, and the like can be used in the same way. As a general rule, primary or secondary alcohols having one to eighteen, preferably one to ten, carbon atoms per molecule have been found most advantageous, especially when used with the preferred ethylenic compounds of two to eighteen, most preferably three to twelve, carbon atoms per molecule.

The following examples further illustrate the process of the invention:

*Example I*

Allyl alcohol was reacted with 90% hydrogen peroxide using a mole ratio of allyl alcohol to hydrogen peroxide of 13.5:1 and 5 grams of $WO_3$ per mole of hydrogen peroxide. In four hours' reaction at 35° C. a 47% conversion of hydrogen peroxide to monoallyl glycerol ether and a 15% conversion to glycerol was obtained. When a mole ratio of allyl alcohol to hydrogen peroxide of 25:1 was used with 3 grams of $WO_3$ per mole of hydrogen peroxide at 50° C., the conversion of hydrogen peroxide to monoallyl glycerol ether was 70% with 16% conversion to glycerol and 10% to higher boiling products.

Trichloromethane chlorophosphonic acid, used at 60° C., was found to be an effective but slower acting catalyst for the production of monoallyl glycerol ether by this reaction, the conversion of $H_2O_2$ being 65% after 1 hour at 60° C.

Using crotyl alcohol instead of allyl alcohol under the same conditions gives an equally good yield of the monocrotyl ether of methylglycerol. Similar results are obtained using phosphotungstic acid as the catalyst.

*Example II*

A mixture of 1.08 g. of tungstic acid and 100 ml. of water was stirred and heated to 70° C. and then 5 ml. of 34% hydrogen peroxide was added to dissolve the tungstic acid. There was then added 300 ml., 254 g. (4.38 moles), of allyl alcohol followed by the dropwise addition of the remaining hydrogen peroxide (100 g., 1.0 mole of 34%, total) in 2.5 hours at 70° C. After standing over night at room temperature, there was 0.009 mole of peroxide left and 44.3 g. of glycerol (48.2% conv. of $H_2O_2$). The water and allyl alcohol were stripped off and the residue distilled.

| | G. |
|---|---|
| Cut No. 1, 85–117° C. (2.0–0.5 mm.) | 29 |
| Cut No. 2, 117–120° C. (0.5–0.7 mm.) | 31.5 |
| Cut No. 3, 113° C. (0.07 mm.) | 5 |
| Residue | 15 |

Cut No. 1 was redistilled.

| | G. |
|---|---|
| Cut No. 4, 108–111° C. (5 mm.) | 1 |
| Cut No. 5, 111–126° C. (5 mm.) | 21 |
| Residue | 7 |

Cuts No. 4 and No. 5 are glycerol allyl ether and represent a 17.6% conversion of $H_2O_2$.

Cut No. 5 was analyzed with the following results:

| | Found | Calc'd for $C_6H_{12}O_3$ |
|---|---|---|
| C | 54.39 | 54.52. |
| H | 8.91 | 9.16. |
| Br. No. g. Br/100 g. | 113 | 121. |
| Hydroxyl value, eq./100 g. | 1.392 | 1.513. |
| Acidity, eq./100 g. | 0.001 | 0.00. |
| Alpha-glycol value calc'd as glycerol alpha-allyl ether. | 83.2 | {100 for alpha. 0 for beta. |

*Example III*

A mixture of 1.08 g. of tungstic acid and 100 ml. of water was stirred and heated to 70° C. There were added 5 ml. of 34% hydrogen peroxide to dissolve the tungstic acid followed by 58 g. (1.0 mole) of allyl alcohol diluted to 300 ml. with methanol. The remaining hydrogen peroxide (100 g., 1.0 mole of 34%, total) was added dropwise over a two and one-quarter hour period at 70° C. After standing over night at room temperature there was 0.025 mole of peroxide remaining. The reaction product was distilled under vacuum and a pre-cut of 418 g. of water, methanol and allyl alcohol removed, followed by:

| | G. |
|---|---|
| Cut No. 1, 88–104° C. (5 mm.) | 23 |
| Cut No. 2, 110–114° C. (<0.5 mm.) | 23 |

Cut No. 1 was redistilled.

| | G. |
|---|---|
| Cut No. 3, 88–110° C. (13 mm.) | 5.5 |
| Cut No. 4, 110–120° C. (13 mm.) | 16 |

Cut No. 2 was added to the residue.

| | G. |
|---|---|
| Cut No. 5, 104–121° C. (5 mm.) | 1.3 |
| Cut No. 6, 121–150° C. (5 mm.) | 6 |
| Cut No. 7, to 140° C. (1 mm.) | 13 |
| Residue | 1 |

Cut No. 4 analyzed as follows:

| | Found | Calc'd for $C_4H_{10}O_3$ |
|---|---|---|
| C | 46.00 | 45.27. |
| H | 9.27 | 9.50. |
| Hydroxyl value, eq./100 g. | 1.519 | 1.89. |
| Alpha-glycol value calc'd as glycerol alpha-methyl ether (percent wt.). | 69.9 | {100.0 for alpha. 0.0 for beta. |
| Acidity, eq./100 g. | 0.003 | 0.0. |

Boiling point and analysis indicate that Cut No. 4 contains glycerol alpha-methyl ether (B. P. 111–112° C. at 13 mm.) and, as such, represents a 15% conversion of allyl alcohol to hydroxy ether.

*Example IV*

Cyclohexene, ethanol and hydrogen peroxide (90% aqueous $H_2O_2$) were reacted together using a 1.5:25:1 mole ratio and 10 grams of tungstic acid catalyst per mole of hydrogen peroxide. The reaction was more than 90% complete in less than three hours at 50° C. and resulted in 40% conversion of hydrogen peroxide to 2-ethoxycyclohexanol and 38% conversion to 1,2-cyclohexanediol.

From the reaction under the same conditions of cyclohexene with 90% hydrogen peroxide and tungstic acid in dry isopropanol solution there was obtained 21% conversion of 2-isopropylcyclohexanol. Under the same conditions, using 16.7 moles of methanol per mole of cyclohexene, a 70% yield of 2-methoxycyclohexanol (a mobile liquid, boiling point 181° C.) was obtained together with a 16% yield of 1,2-cyclohexanediol, based on the hydrogen peroxide, in 1½ hours.

When tertiary butyl alcohol was used with cyclohexene and hydrogen peroxide under conditions identical with the foregoing tests, no ether product could be found, the product being exclusively 1,2-cyclohexanediol.

*Example V*

The reaction of 2-butene with 90% hydrogen peroxide and methanol, using tungstic acid catalyst, was carried out at room temperature with a mole ratio of olefin to alcohol to peroxide of 1.5:25:1. The peroxide was consumed in 18 hours and distillation afforded a 39% yield of 3-methoxy-2-butanol and a 10% yield of 2,3-butanediol, based on hydrogen peroxide.

Under similar conditions, except using isobutylene in place of 2-butene, a good yield of isomeric monomethyl ethers of 2-methyl-1,2-propanediol is obtained and, by shaking propylene in methanol solution at 50° C. for 12 hours with 34% hydrogen peroxide solution (mole ratio 2:10:1) and tungstic acid catalyst (10 grams per mole of hydrogen peroxide), there was obtained a 23% yield (based on hydrogen peroxide) of a mixture of 2-methoxypropanol and 1-methoxy-2-propanol and a 14% yield of propylene glycol. These yields can be improved by operating under pressure.

*Example VI*

A solution of 210 g., (1.5 moles) of 1-decene (B. P. 170–171° C.), 38.0 g. (1.0 mole) of 90% hydrogen peroxide, and 10 g. of tungstic acid in 800 g. (25 moles) of methanol was stirred at 55–60° C. for four hours at which time over 90% of the peroxide had been consumed.

Distillation through a two-foot packed column afforded 85 g. (0.61 mole) of recovered 1-decene and 102 g. of a mixture of 2-methoxydecanol-1 and 1-methoxydecanol-2, B. P. 80–90° C. (1 mm.) (62% yield based on olefin converted). Crude 1,2-decanediol, B. P. 143–158° C., was obtained in 14% yield.

The reaction of 1-dodecene (1.5 moles) with hydrogen peroxide (1.0 mole of 34%) and tungstic acid (10 grams) in ethanol solution (14 moles) at 40–50° C. for 6 hours gave a 23% conversion of olefin to hydroxyethoxy-dodecane, apparently 1-ethoxy-2-dodecanol, and crude 1,2-diol. When tertiary butyl alcohol was used in place of ethanol, no hydroxy ether was found among the products.

*Example VII*

A solution of 74 g. (0.25 mole) of methyl oleate (B. P. 166–172° C./1 mm.), 30 g. (0.30 mole) of 34% hydrogen peroxide, and 5 g. of tungstic acid in 300 ml. of methanol was stirred at 45–50° C. for 3 hours, at which time one molar equivalent of peroxide had been consumed. The reaction mixture was poured into a liter of water containing 2 g. of sodium carbonate and extracted with 300 ml. of benzene. The benzene extract was washed with water and concentrated to a crude residue of 77 g. Claisen distillation afforded 60 g. of product (70% yield), B. P. 200–235° C. (5 mm.), the analysis of which indicated it to contain 43% w. methyl 9,10-dihydroxystearate and 48% w. methyl 9(10)-hydroxy-10(9)-methoxystearate. Found: C, 69.0; H, 11.6; alpha-glycol value, 0.13 mole/100 g.; alkoxy value, 0.41 eq./100 g.

Fish oils and polyisobutylenes reacted under similar conditions, using methanol as the alcohol, give mixed polymethoxy-polyhydroxy products.

*Example VIII*

1.2 moles of cyclohexene and 1.0 mole of 90% hydrogen peroxide in 500 ml. of methanol were stirred at 55° C. with one milliliter of sulfuric acid as catalyst. After eleven hours, 85% of the peroxide had been consumed. Distillation resulted in the recovery of 2-methoxycyclohexanol in 60% yield, based on the 0.84 mole of cyclohexene converted. There was also obtained a 14% yield of higher boiling material, chiefly 1,2-cyclohexanediol.

By the use of phenol and benzyl alcohol in place of methanol in this reaction, 2-phenoxycyclohexanol and 2-benzyloxycyclohexanol, respectively, are obtained in the same way.

We claim as our invention:

1. A process of producing an unsymmetrical hydroxy ether which comprises reacting an ethylenic compound, wherein the valencies of the ethylenically doubly bonded carbon atoms are each taken up by a member of the group consisting of the hydrogen and carbon atoms, with an alcohol having at least one hydrogen atom directly attached to the carbinol carbon atom and with hydrogen peroxide under the catalytic influence of not more than 0.075 mole per mole of hydrogen peroxide employed of a strong acid which has an ionization constant for the first hydrogen greater than $1.86 \times 10^{-5}$ at 25° C. and reacts with hydrogen peroxide to form a peracid, the mole ratio of said alcohol to hydrogen peroxide being at least 10:1.

2. A process of producing an unsymmetrical hydroxy ether which comprises reacting an ethylenic compound, wherein the valencies of the ethylenically doubly bonded carbon atoms are each taken up by a member of the group consisting of the hydrogen and carbon atoms, with a saturated alcohol having at least one hydrogen atom directly attached to the carbinol carbon atom and with hydrogen peroxide under the catalytic influence of not more than 0.075 mole per mole of hydrogen peroxide employed of a strong inorganic acid which has an ionization constant for the first hydrogen greater than $1.86 \times 10^{-5}$ at 25° C. and reacts with hydrogen peroxide to form a peracid, the mole ratio of said alcohol to hydrogen peroxide being at least 10:1 and the mole ratio of said alcohol to said ethylenic compound being at least about 10:1.

3. A process of producing an unsymmetrical hydroxy ether which comprises reacting an ethylenic alcohol, wherein the valencies of the ethylenically doubly bonded carbon atoms are each taken up by a member of the group consisting of the hydrogen and carbon atoms, with a saturated alcohol having at least one hydrogen atom directly attached to the carbinol carbon atom and with hydrogen peroxide in the presence of a catalytic amount not greater than 0.075 mole per mole of hydrogen peroxide employed of a strong inorganic peracid catalyst which has an ionization constant for the first hydrogen greater than $1.86 \times 10^{-5}$ at 25° C., the mole ratio of said saturated alcohol to hydrogen peroxide being at least 10:1 and the mole ratio of said saturated alcohol to said ethylenic alcohol being at least about 10:1.

4. A process in accordance with claim 3 wherein the mole ratio of said ethylenic alcohol to said hydrogen peroxide is about 10:1 to about 50:1.

5. A process of producing an unsymmetrical hydroxy ether which comprises reacting an ethylenic compound free from hydroxyl groups, wherein the valencies of the ethylenically doubly bonded carbon atoms are each taken up by a member of the group consisting of the hydrogen and carbon atoms, with an alcohol having at least one hydrogen atom linked directly to the carbinol carbon atom and with hydrogen peroxide under the catalytic influence of a catalytic amount not greater than 0.075 mole per mole of hydrogen peroxide employed of a strong inorganic acid which has an ionization constant for the first hydrogen greater than $1.86 \times 10^{-5}$ at 25° C. and reacts with hydrogen peroxide to form a peracid, the mole ratio of said alcohol to hydrogen peroxide being at least 10:1 and the mole ratio of said alcohol to said ethylenic compound being at least about 10:1.

6. A process of producing an unsymmetrical hydroxy ether which comprises reacting an ethylenic hydrocarbon, wherein the valencies of the ethylenically doubly bonded carbon atoms are each taken up by a member of the group consisting of the hydrogen and carbon atoms, with an alcohol having at least one hydrogen atom linked directly to the carbinol carbon atom and with hydrogen peroxide in the presence of a catalytic amount within the range of about 0.005 to 0.075 mole per mole of hydrogen peroxide of a strong inorganic peracid catalyst which has an ionization constant for the first hydrogen greater than $1.86 \times 10^{-5}$ at 25° C., the mole ratio of said alcohol to hydrogen peroxide being at least 10:1 and the mole ratio of said alcohol to said ethylenic compound being at least about 10:1.

7. A process in accordance with claim 6 wherein the ethylenic hydrocarbon is a cyclo-olefin.

8. A process in accordance with claim 6 wherein the alcohol is a saturated primary monohydric alcohol having 1 to 3 carbon atoms per molecule.

9. A process of producing an unsymmetrical hydroxy ether which comprises reacting an ethylenic hydrocarbon, wherein the valencies of the ethylenically doubly bonded carbon atoms are each taken up by a member of the group consisting of the hydrogen and carbon atoms, with an alcohol having at least one hydrogen atom linked directly to the carbinol carbon atom and with hydrogen peroxide in the presence of tungstic acid catalyst, the mole ratio of said alcohol to hydrogen peroxide being at least 10:1 and the mole ratio of said alcohol to said ethylenic compound being at least about 10:1.

10. A process of producing an unsymmetrical hydroxy ether which comprises reacting an ethylenic alcohol, wherein the valencies of the ethylenically doubly bonded carbon atoms are each taken up by a member of the group consisting of the hydrogen and carbon atoms, having at least one hydrogen atom directly attached to the carbinol carbon atom and a peroxide in a mole ratio of at least 10:1 in the presence of a strong inorganic peracid catalyst which has an ionization constant for the first hydrogen greater than $1.86 \times 10^{-5}$ at 25° C., the mole ratio of water to said alcohol being not more than 4:1.

11. A process of producing an unsymmetrical ether of an ethylenic primary alcohol, wherein the valencies of the ethylenically doubly bonded carbon atoms are each taken up by a member of the group consisting of the hydrogen and carbon atoms, and a trihydric alcohol which comprises reacting said ethylenic primary alcohol with hydrogen peroxide, the mole ratio of said primary alcohol to hydrogen peroxide being at least 10:1 in the presence of a tungstic acid hydroxylation catalyst, the mole ratio of water to said alcohol being not more than 4:1.

12. A process of producing an unsymmetrical hydroxy ether which comprises reacting a mono-ethylenic monohydric aliphatic alcohol having at least one hydrogen atom attached to the carbinol carbon atom and 3 to 18 carbon atoms per molecule with hydrogen peroxide in the presence of tungstic acid, the mole ratio of said alcohol to hydrogen peroxide being about 10:1 to 50:1 whereby two moles of said alcohol react with one mole of said peroxide according to the equation:

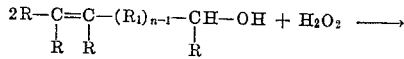

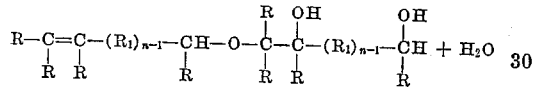

where the R's represent alkyl groups or hydrogen atoms, $R_1$ represents an alkylene radical, and $n$ is a positive whole number having a maximum value of two.

13. A process of producing a monoallyl ether of glycerol which comprises reacting allyl alcohol with hydrogen peroxide in the presence of tungstic acid using a mole ratio of allyl alcohol to hydrogen peroxide of at least 10:1.

14. A process of producing a monoalkyl ether of glycerol which comprises reacting a saturated aliphatic alcohol having at least one hydrogen atom attached to the carbinol carbon atom, allyl alcohol and hydrogen peroxide in the ratios of about 10 to about 50 moles of saturated alcohol and about 0.5 to about 4 moles of allyl alcohol per mole of hydrogen peroxide in the presence of tungstic acid at about 20° C. to 100° C.

15. A process in accordance with claim 14 wherein the saturated alcohol is a primary alcohol of one to eighteen carbon atoms.

16. A process in accordance with claim 14 wherein the saturated alcohol is a secondary alcohol of three to eighteen carbon atoms.

17. A process of producing a 2-alkoxycyclohexanol which comprises reacting a monohydric alcohol having 1 to 3 carbon atoms per molecule and at least one hydrogen atom attached to the carbinol carbon atom, cyclohexene and hydrogen peroxide in the presence of tungstic acid catalyst using a mole ratio of said alcohol to hydrogen peroxide of at least 10:1 and a mole ratio of cyclohexene to hydrogen peroxide of 1:1 to 2:1.

18. A process of producing 2-methoxycyclohexanol which comprises reacting methanol, cyclohexene and hydrogen peroxide in a mole ratio of 10 to 35 moles of methanol and 1 to 2 moles of cyclohexene per mole of hydrogen peroxide in the presence of tungstic acid.

References Cited in the file of this patent

UNITED STATES PATENTS

| | | |
|---|---|---|
| 2,373,942 | Bergsteinsson | Apr. 17, 1945 |
| 2,414,385 | Milas | Jan. 14, 1947 |
| 2,510,905 | Raczynski | June 6, 1950 |
| 2,714,602 | Abbott | Aug. 2, 1955 |

OTHER REFERENCES

Lespieau et al.: Compte rendu, vol. 146 (1908), p. 1037.
Swern: Chem. Reviews, vol. 45 (August 1949), pp. 5, 25–30.